US007747427B2

United States Patent
Lee et al.

(10) Patent No.: US 7,747,427 B2
(45) Date of Patent: Jun. 29, 2010

(54) APPARATUS AND METHOD FOR AUTOMATIC TRANSLATION CUSTOMIZED FOR DOCUMENTS IN RESTRICTIVE DOMAIN

(75) Inventors: Ki Young Lee, Daejeon (KR); Yoon Hyung Roh, Daejeon (KR); Sung Kwon Choi, Daejeon (KR); Oh Woog Kwon, Daejeon (KR); Sang Kyu Park, Daejeon (KR); Young Kil Kim, Daejeon (KR); Chang Hyun Kim, Daejeon (KR); Young Ae Seo, Daejeon (KR); Seong Il Yang, Daejeon (KR); Cheol Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 828 days.

(21) Appl. No.: 11/633,896

(22) Filed: Dec. 5, 2006

(65) Prior Publication Data
US 2007/0150260 A1 Jun. 28, 2007

(30) Foreign Application Priority Data
Dec. 5, 2005 (KR) ...................... 10-2005-0117691
Jun. 22, 2006 (KR) ...................... 10-2006-0056203

(51) Int. Cl.
G06F 17/28 (2006.01)
(52) U.S. Cl. ........................ 704/2; 704/4; 704/5; 704/9; 704/1
(58) Field of Classification Search ...................... 704/2, 704/4, 5, 9, 1
See application file for complete search history.

(56) References Cited

U.S. PATENT DOCUMENTS

| 6,278,967 | B1 * | 8/2001 | Akers et al. ..................... 704/2 |
| 6,349,276 | B1 | 2/2002 | McCarley |
| 6,393,388 | B1 * | 5/2002 | Franz et al. ..................... 704/4 |
| 7,089,493 | B2 * | 8/2006 | Hatori et al. ................. 715/259 |
| 2002/0035466 | A1 * | 3/2002 | Kodama ........................ 704/4 |
| 2003/0154071 | A1 * | 8/2003 | Shreve .......................... 704/9 |
| 2005/0060160 | A1 | 3/2005 | Roh et al. |
| 2005/0171757 | A1 | 8/2005 | Appleby |

FOREIGN PATENT DOCUMENTS

| JP | 05-158969 | 6/1993 |
| KR | 1020030056655 | 7/2003 |
| KR | 1020020088062 | 7/2004 |
| KR | 1020040065468 | 7/2004 |

(Continued)

*Primary Examiner*—Qi Han
(74) *Attorney, Agent, or Firm*—Ladas & Parry LLP

(57) ABSTRACT

An apparatus and method for automatic translation of patent documents are provided. Translation knowledge customized for the patent domain is extracted and used. The method includes the steps of: extracting a number of technical terms from a patent document and assigning translated terms for the extracted technical terms; extracting expressions frequently used in patent documents, not in a document in a general domain, and constructing translated expressions; using the translation knowledge constructed in this way, applying a sentence pattern to extraordinarily long sentences in a patent document, dividing the sentence by recognition of parallel structure and syntax clues; and extracting translation units available for parsing and performing structure analysis.

15 Claims, 7 Drawing Sheets

FOREIGN PATENT DOCUMENTS

| | | |
|---|---|---|
| KR | 1020040102329 | 12/2004 |
| KR | 1020050027298 | 3/2005 |
| KR | 1020050063990 | 6/2005 |
| KR | 1020060064443 | 6/2006 |
| WO | WO02097662 | 12/2002 |

* cited by examiner

APPARATUS AND METHOD FOR AUTOMATIC TRANSLATION CUSTOMIZED FOR DOCUMENTS IN RESTRICTIVE DOMAIN

CROSS-REFERENCE TO RELATED APPLICATION

This application claims priority to and the benefit of Korean Patent Application Nos. 2005-117691, filed Dec. 5, 2005, and 2006-56203, filed Jun. 22, 2006, the disclosures of which are incorporated herein by reference in their entirety.

BACKGROUND

1. Field of the Invention

The present invention relates to an automatic translation system, and more particularly, to an apparatus and method for automatic translation customized for documents in a restrictive domain.

2. Discussion of Related Art

Machine translation or automatic translation systems have been studied since the invention of the computer. However, in spite of its long development history, considering the current market, etc., it can hardly be said that there is an automatic translation system that provides satisfactory output quality to users in general domains.

This is because, with development of a web environment, conventional automatic translation systems like a web document translation system were developed for documents having various expressions and words. For this reason, the most basic elements of automatic translation, such as vocabularies and rules or patterns for transformation have been difficult to perfectly construct due to linguistic characteristics.

Accordingly, serious errors such as words not found in the dictionary, exceeding the coverage of analysis rules, and non-existing transformation data occurred. Consequently, actual output quality is not even close to being on a commercial level, thus blocking commercialization of such automatic translation systems.

Various problems occurring in unrestricted domains naturally attracted attempts to reduce the scope of automatic translation to a restrictive domain. For the purpose of commercialization, this was a very reasonable target considering the state of automatic translation technology at the time.

Particularly, in the case of a patent domain, which is an example of a restrictive domain, the number of patent applications filed and registered all over the world in one year has been rapidly increasing. And, interest in foreign patents as well as domestic patents has been increasing in the global era. Currently, most patent documents are translated by professional translators. Accordingly, individuals not belonging to a company have difficulty in searching for and producing patent documents in a foreign language. Companies also have difficulty due to increase in the cost and time required for patent document translation.

Meanwhile, the problems described below appear in translating a document in a restrictive domain, such as a patent document, using knowledge for a general domain.

First, the most important knowledge for automatic translation generally includes a word, analysis rules/patterns, and transformation rules/patterns. When a document corresponding to the patent domain is translated using this conventional knowledge, the first problem which comes up is unknown words. That is, in the domain of patents, extensive technical terminology of various fields such as electric science, electronics, chemistry, physics, computers, etc. is used. And, even common terms tend to take on a different meaning in a patent document.

Second, patent documents frequently contain certain expressions that are rarely used in other domains. Thus, application of conventional syntax rules or patterns used in the general domain results in a coverage problem.

Third, in automatic translation, the longer a sentence, the more ambiguous its structure. Thus, analysis time goes up significantly and structure analysis performance goes down. Accordingly, it is not easy to analyze and translate a patent document without an appropriate process for long sentences, because long sentences having hundreds of words are often found in patent documents.

SUMMARY OF THE INVENTION

The present invention is directed to an apparatus and method for automatic translation that extract knowledge customized for a restrictive domain and effectively perform automatic translation of a document corresponding to the restrictive domain using the extracted knowledge.

The present invention is also directed to an apparatus and method for automatic translation that extract a possible analysis scope to parse long sentences which are difficult to handle in a general analysis method and perform structure analysis, using the extracted knowledge customized for a restrictive domain.

The present invention is also directed to an apparatus and method for automatic translation that can produce a natural output by constructing a reasonable number of analysis rules or translation patterns in order to prevent a reduction in output quality, and previously constructing analysis rules or translation patterns for frequently used expressions in a corresponding domain.

One aspect of the present invention provides an apparatus for automatic translation, comprising: a knowledge extracting part for extracting knowledge necessary for translating sentences constituting a document in a restrictive domain; and a translating part for generating an output for an input sentence based on a dictionary and a transformation pattern to which the extracted translation knowledge is applied.

The knowledge extracting part may comprise: a technical term constructing part for extracting and constructing technical terms by constructing a corresponding corpus according to the document in the restrictive domain through morpheme-analyzing and tagging; a translated term constructing and filtering part for applying a weight and extracting a high-frequency expression by a longest-first method, filtering a sentence/phrase pattern, and constructing translated words for the constructed technical terms; and a sentence/phrase pattern constructing part for constructing a syntax translation pattern and a sentence translation pattern of a corresponding domain according to a frequently repeated word string and example based on the corresponding corpus.

The weight may be applied corresponding to word frequency and closeness with a co-occurring word according to the restrictive domain.

The translating part may comprise: a pre-processing part for dividing an input sentence, dividing terms appearing in the divided sentence into tokens, and classifying the tokens into symbols, formulae, and words; a morpheme-analyzing and tagging part for analyzing morphemes of the tokens, and tagging statistical parts of speech (POS) using a lexicalized HMM (Hidden Markov Model) produced with the assistance of the knowledge extracting part; a structure analyzing part for dividing the sentence which is morpheme-analyzed and tagged according to a sentence pattern and a syntax pattern, parsing each node of the pattern, and generating a final syntactic analysis result; a structure and term transforming part for transforming the structure of the syntactic analysis result using a transformation pattern according to the translation knowledge extracted from the knowledge extracting part so as to transform the result into a structure of a target language, and transforming each term using a dictionary; and a generating part for generating a final sentence in a target language with the transformed structure and terms output from the structure and term transforming part.

Another aspect of the present invention provides an automatic translation method customized for documents in a restrictive domain, comprising the steps of: (a) constructing a specific corpus according to a restrictive domain through morpheme-analysis and tagging and extracting technical terms from documents written in a source language; (b) applying a weight according to the restrictive domain and extracting a high-frequency expression by a longest-first method, filtering a sentence/phrase pattern, and constructing translated words for the constructed technical terms; (c) constructing a syntax translation pattern and a sentence translation pattern based on the specific corpus constructed in step (a); (d) dividing the morpheme-analyzed and tagged sentence according to a sentence pattern, parsing each node of the sentence pattern, and generating a syntactic analysis result; (e) performing transformation of a target language structure by transforming the structure of the syntactic analysis result using the syntax and sentence translation patterns constructed in step (c), and performing transformation of each term; and (f) generating a sentence in the target language by the transformed structure and terms.

Step (a) may comprise the steps of: (a1) inputting a large document corpus constructed from documents written in a source language, dividing the corpus into sentences, and classifying terms in the divided sentences into tokens; (a2) analyzing morphemes and tagging all parts of speech (POSs) that are allowable for each token; (a3) performing statistical POS tagging assigning a specific POS to each word using predetermined word/POS/context probability data and word probability data, and constructing a specific corpus to which the specific POS is assigned; and (a4) extracting a technical term from the specific corpus.

Step (a1) may comprise a step of dividing a long sentence according to a long sentence division rule when an input document has a long sentence.

The token in step (a1) may be defined as one of a symbol, a formula, and a word.

Step (a4) is performed by satisfying at least one of the following conditions:

Condition 1) unknown word: word which is not found in a general domain dictionary; or Condition 2) $w_i$, word satisfying <Formula 1>:

$$\sum_{j=1}^{k} \text{abs}\left(\frac{f(w_i, t_{ij})}{f(w_i)} - \frac{f'(w_i, t_{ij})}{f'(w_i)}\right) \geq \alpha \quad \text{<Formula 1>}$$

or $$\max_{j=1}^{k} \text{abs}\left(\frac{f(w_i, t_{ij})}{f(w_i)} - \frac{f'(w_i, t_{ij})}{f'(w_i)}\right) \geq \beta$$

wherein, $f(w_i)$: total frequency of word $w_i$ in a general domain, $f(w_i, t_{ij})$: frequency with which word $w_i$ is represented as POS $t_{ij}$ in a general domain, $f'(w_i)$: total frequency of word $w_i$ in corresponding domain, $f'(w_i, t_{ij})$: frequency with which word $w_i$ is represented as POS $t_{ij}$ in corresponding domain, α: total sum of threshold values (0.15 used in present embodiment), and β: maximum threshold value (0.1 used in present embodiment).

Step (b) may comprise the steps of: (b1) calculating occurrence frequency of each translated word in each dictionary entry from the specific corpus; (b2) extracting terms co-occurring with the each translated word and calculating mutual information between the terms; (b3) calculating a use weight of each translated word using values obtained from the word frequency and co-occurring words; (b4) applying the use weight of the translated word and filtering a translated word of each dictionary entry according to importance of use in a specific domain; and (b5) constructing translated words for the technical terms based on the filtered sentence/phrase pattern and defined weight.

The weight of step (b) may correspond to word frequency and closeness with co-occurring terms according to the restrictive domain.

Step (c) may comprise the steps of: (c1) extracting the highest frequency string of the specific corpus constructed in step (a), and generating a frequently repeated word string and example from the extracted string; (c2) determining possibility of being a syntax or sentence pattern candidate; (c3) checking whether the frequently repeated word string and example are a start/end node of a phrase or a POS node and constructing a specific syntax translation pattern, when the frequently repeated word string and example are determined to be the syntax pattern candidate; and (c4) constructing a specific sentence translation pattern for a whole sentence, when the frequently repeated word string and example are determined to be the sentence pattern candidate.

Step (d) may comprise the steps of: (d1) determining a pattern of the morpheme-analyzed and tagged sentence; (d2) recognizing a parallel structure, dividing the sentence by parallel node parsing, and performing syntax node parsing, when determined to be the syntax pattern; (d3) performing syntax node parsing for each node of the sentence pattern, when determined to be the sentence pattern; and (d4) treating the syntax node parsed result as one chart, parsing the whole sentence again, and generating a final structure analysis result.

The parallel structure recognition may comprise the steps of: generating a parallel structure candidate by the syntax pattern, when a partial sentence to be syntax node parsed is longer than a specific length; and selecting a parallel structure by a parallel node recognition means and a syntax node limitation for each candidate of the parallel structure.

Step (e) may comprise the steps of: (e1) transforming a structure of an input document in the source language into a sentence structure of the target language using the syntax and sentence translation pattern constructed in step (c); (e2) selecting an optimal translated word for each source word according to the source language document using a simplex and compound noun dictionary, and performing term-by-term transformation; and (e3) producing a transformation data structure based on the structure and term transformation results.

The structural transformation in step (e1) may be performed in sentences, clauses and phrases.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The foregoing and other objects, features and advantages of the invention will be apparent from the following more particular description of exemplary embodiments of the invention, as illustrated in the accompanying drawings.

Hereinafter, exemplary embodiments of an apparatus and method for automatic translation customized for documents in a restrictive domain according to the present invention will be described in detail. In the exemplary embodiments described below, the restrictive domain is the patent domain. However, in alternative embodiments the restrictive domain may be some other domain instead of the patent domain.

Figure 1:
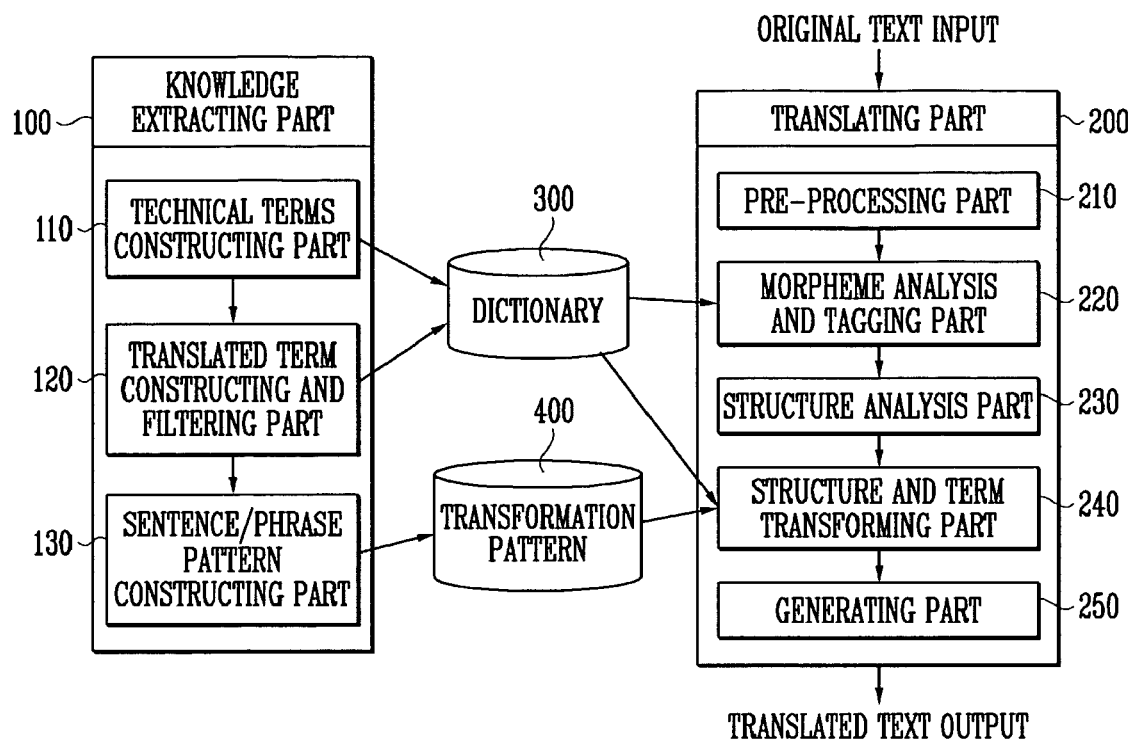
FIG. 1 illustrates the overall structure of an automatic translation apparatus customized for patent documents according to the present invention.

FIG. 1 illustrates the overall structure of an automatic translation apparatus customized for patent documents according to the present invention.

Referring to FIG. 1, the automatic translation apparatus comprises a knowledge extracting part 100 for extracting translation knowledge required to translate sentences constituting a document of a restrictive domain based on a document of the restrictive domain, and a translating part 200 for generating an output for an input sentence by applying the extracted translation knowledge to a dictionary and a transformation pattern.

Here, the knowledge extracting part 100 comprises a technical terms constructing part 110 for extracting and constructing technical terms by constructing a patent corpus according to the patent domain through morpheme-analysis and tagging processes when sentences written in a source language are input, a translated term constructing and filtering part 120 for extracting high-frequency expressions by a longest-first method by applying weight corresponding to word frequency and closeness with co-occurring words in the patent domain and filtering a sentence/phrase pattern so as to construct translations of the constructed technical terms, and a sentence/phrase pattern constructing part 130 for constructing syntax and sentence translation patterns of the corresponding domain according to a frequently repeated word string and example based on the patent corpus.

Also, the translating part 200 comprises a pre-processing part 210 for dividing an input original sentence into smaller sentences using a sentence division rule, dividing terms appearing in the separated sentence into tokens, and then classifying the tokens into symbols, formulas, words, etc., a morpheme analyzing and tagging part 220 for analyzing morphemes of preprocessed tokens using a morpheme analysis dictionary and tagging statistical parts of speech (POS) using a Lexicalized Hidden Markov Model (HMM) in cooperation with the knowledge extracting part, a structure analysis part 230 for dividing the sentence which is morpheme-analyzed and tagged with a sentence pattern and a syntax pattern so as to parse each node of the sentence pattern and thereby generate a final syntactic analysis result, a structure and term transforming part 240 for structurally transforming the syntactic analysis result using a transformation pattern according to the sentence/phrase pattern constructed in the sentence/phrase pattern constructing part 130 of the knowledge extracting part 100 into a target language structure and then transforming each word using a dictionary, and a generating part 250 for generating a final target language sentence with the transformed structure and terms output from the structure and term transforming part 240.

A method for automatic translation customized for patent documents according to the present invention will now be described with reference to attached drawings.

Figure 2:
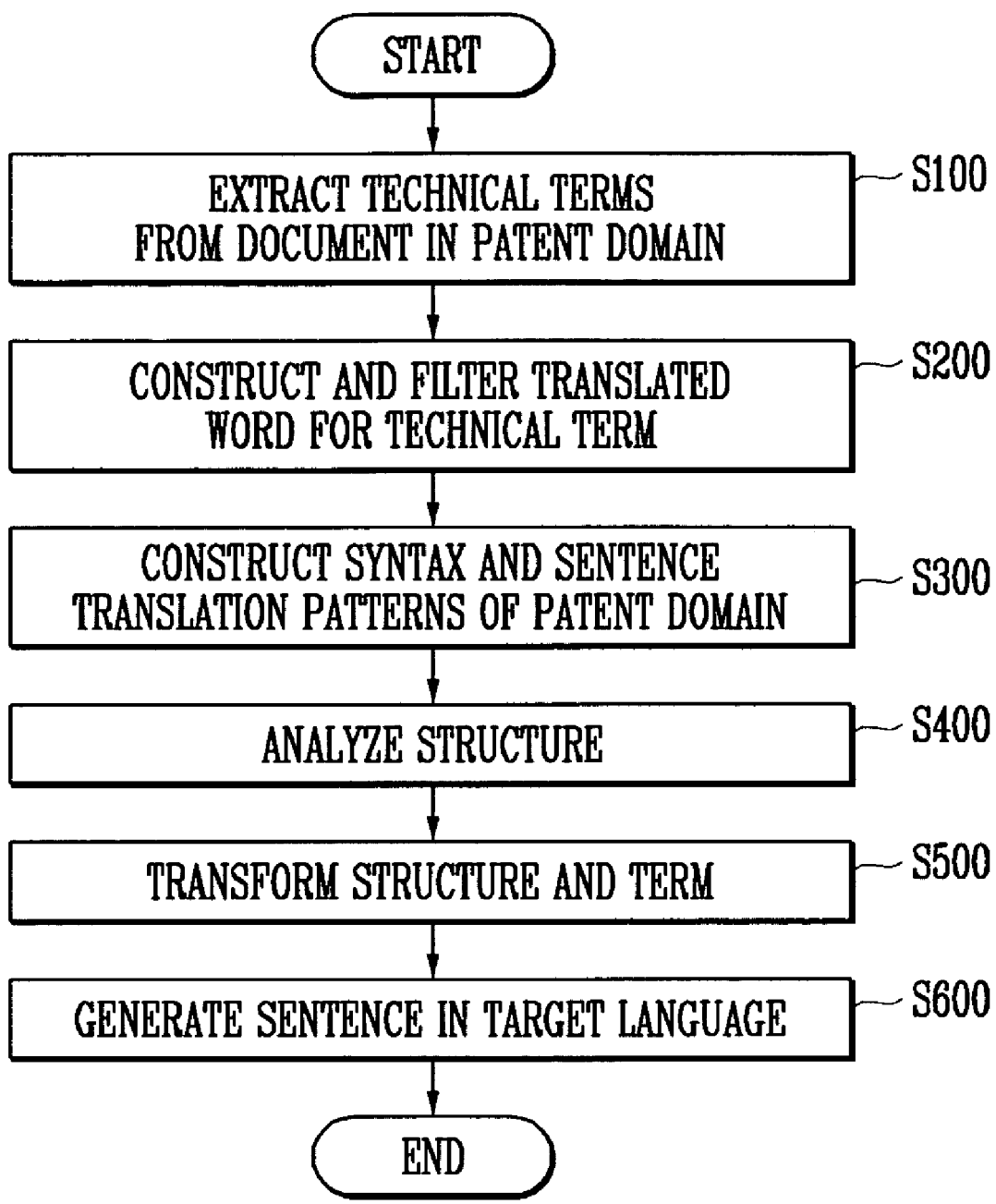
FIG. 2 is a flowchart illustrating a method for automatic translation customized for patent documents according to the present invention.

FIG. 2 is a flowchart illustrating a method for automatic translation customized for patent documents according to the present invention.

Referring to FIG. 2, first, sentences written in a source language are input, a patent corpus is constructed by morpheme analysis and tagging, and then technical terms are constructed in the patent corpus (S100).

Figure 3:
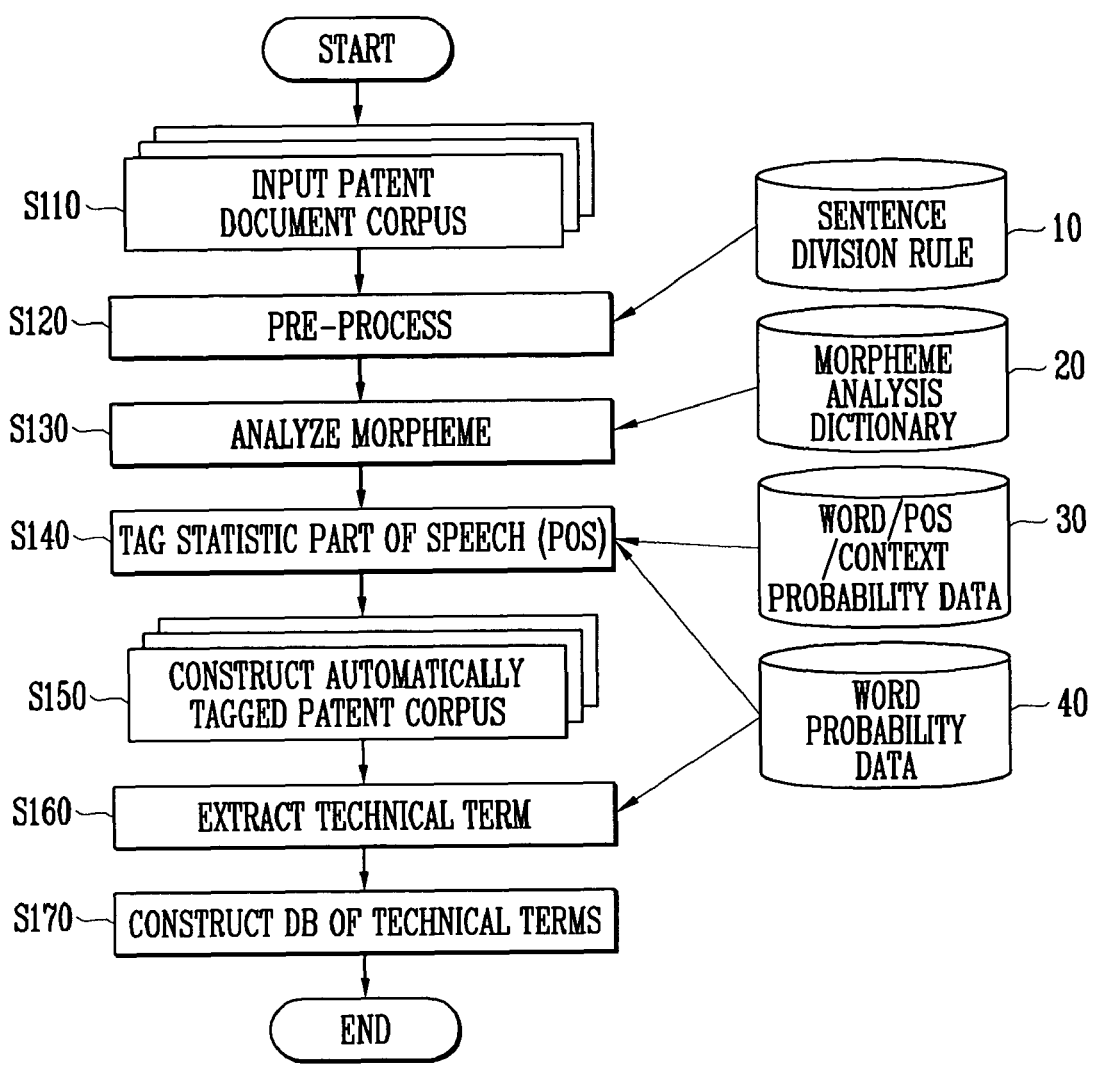
FIG. 3 is a flowchart illustrating a method of constructing technical terms in an automatic translation method customized for patent documents according to the present invention.

FIG. 3 is a flowchart illustrating a method of constructing technical terms in an automatic translation method customized for patent documents according to the present invention. Referring to FIG. 3, a method of constructing technical terms will be described in detail.

First, a pre-process is performed, in which a large patent document corpus written in a source language is input (S110), the input patent document corpus is separated into sentences using a sentence division rule 10, and terms appearing in each sentence are categorized into tokens (S120).

The tokens are classified into symbols, formulae, words, etc. Also, when the input sentence is long, the long sentence is separated into several fragments by a long sentence version of the sentence division rule 10.

That is, the long sentence division rule is a regular expression which has tokens including words, head symbols, tail symbols, and sentence division marks. And the sentence separation regular expression consists of a <condition part> and a <sentence separation part>. Here, the <condition part> consists of an arrangement of input terms and head/tail symbols, and the <sentence separation part> indicates a sentence separation type including the sentence division marks.

Thus, when the input sentence satisfies the <condition part>, the sentence is separated according to the expression of the <sentence separation part> by the long sentence division rule.

For example, when the <condition part> is "including:" and the <sentence separation part> is "including the following:\n", "including:" in the input sentence is replaced by "including the following:" and then the sentence is separated.

After such a pre-process is finished, morphemes are analyzed by using a morpheme analysis dictionary 20, and all allowable parts of speech (POS) are attached to each token (S130). Here, a word which is not found in the morpheme analysis dictionary is dealt with as an unknown word.

In order to determine a POS appropriately used in the sentence among all allowable POSs, statistical POS tagging enabling an optimized POS to be assigned to each word using predetermined word/POS/context data 30 and word probability data 40 is performed (S140). Here, tagging may be performed using a Lexicalized HMM (Hidden Markov Model).

Thus, an automatically tagged patent corpus in which an optimal POS is assigned to each word of the input patent document corpus is constructed (S150).

After technical terms are extracted from the constructed patent corpus (S160), the data of the extracted technical terms are accumulated (S170). Here, the technical terms used in the corresponding domain, if used in the general domain, often have very different POSs from in the general domain. Thus, if even one of the following conditions is satisfied, the word is extracted as a technical term of the corresponding domain.

Here, to find a word satisfying the following conditions, the constructed automatically tagged patent corpus is used.

Condition 1) unknown word: word that does not exist in morpheme analysis dictionary Condition 2) $w_i$, word satisfying Formula 1:

$$\sum_{j=1}^{k} \text{abs}\left(\frac{f(w_i, t_{ij})}{f(w_i)} - \frac{f'(w_i, t_{ij})}{f'(w_i)}\right) \geq \alpha \quad \text{[Formula 1]}$$

or $$\max_{j=1}^{k} \text{abs}\left(\frac{f(w_i, t_{ij})}{f(w_i)} - \frac{f'(w_i, t_{ij})}{f'(w_i)}\right) \geq \beta$$

wherein, $f(w_i)$: total frequency of word $w_i$ in a general domain, $f(w_i, t_{ij})$: frequency with which word $w_i$ is represented as POS $t_{ij}$ in a general domain, $f'(w_i)$: total frequency of word $w_i$ in automatically tagged patent corpus, $f'(w_i, t_{ij})$: frequency with which word $w_i$ is represented as POS $t_{ij}$ in automatically tagged patent corpus, α: total sum of threshold values (0.15 used in present embodiment), and β: maximum threshold value (0.1 used in present embodiment).

In the above Formula 1, the values of $f(w_i)$ and $f(w_i, t_{ij})$, which are to be obtained from the general domain, are values already in the word probability data 40 constructed from the tagged corpus in the general domain for statistical POS tagging.

As a second step, weight corresponding to word frequency according to the patent domain and closeness with co-occurring words is applied so as to extract high-frequency expressions by the longest-first method, filter a sentence/phrase pattern, and construct translations of the technical terms (S300).

That is, in the case of a common dictionary or a dictionary for technical terms which is used in the conventional general domain, the use frequency of the translated words may be different from in a specific restrictive domain such as the patent domain. In other words, when documents in the specific domain such as the patent domain are translated with the conventional general domain dictionary, translated words which are frequently used in the specific domain are not used due to different use weights of the translated words. Accordingly, even though structural transformation is properly performed, an output may not accurately suit the context.

Thus, a plan for filtering translated words of each entry in a conventional general domain dictionary based on a monolingual corpus written in a target language will be introduced.

Figure 4:
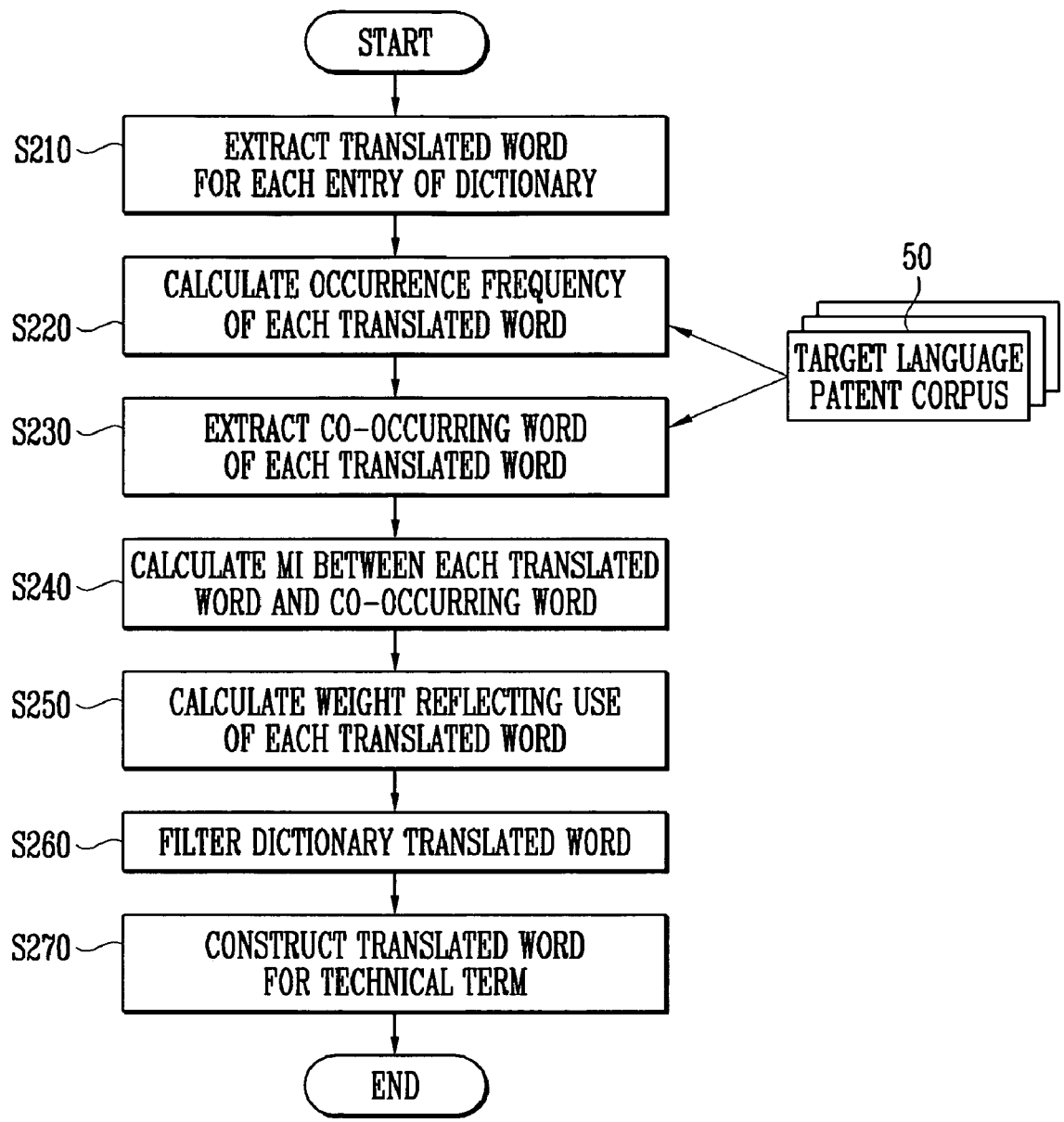
FIG. 4 is a flowchart illustrating a method of constructing and filtering translated words in an automatic translation method customized for patent documents according to the present invention.

FIG. 4 is a flowchart illustrating a method of constructing and filtering translated words in an automatic translation method customized for patent documents according to the present invention. Referring to FIG. 4, the method of constructing and filtering translated words with respect to technical terms will be described in detail.

First, translated words by each entry of a general domain dictionary are extracted (S210), and the frequency of occurrence of each translated word is calculated (S220).

Frequencies of words occurring in a corpus 50 in a patent domain written in the target language are calculated (S220), and the degree of relatedness between translated words and co-occurring words is calculated based on mutual information (S230).

Then, using a weight function obtained from calculation of the frequency and relatedness with co-occurring words, a use weight of each translated word is calculated (S250).

Thereby, sentence/phrase patterns are filtered by determining how important the corresponding translated word is in the specific domain (S260).

Through this process, the translated words in the conventional general dictionary and technical terms dictionary constructed to be suitable for the general domain are used to reconstruct other translated words for the constructed technical terms by a weight function newly defined to be customized for a new specific domain (S270).

And, as a third step, syntax and sentence translation patterns of a corresponding domain according to frequently repeated word strings and examples are constructed based on the patent corpus constructed in the first step (S100) (S300).

Figure 5:
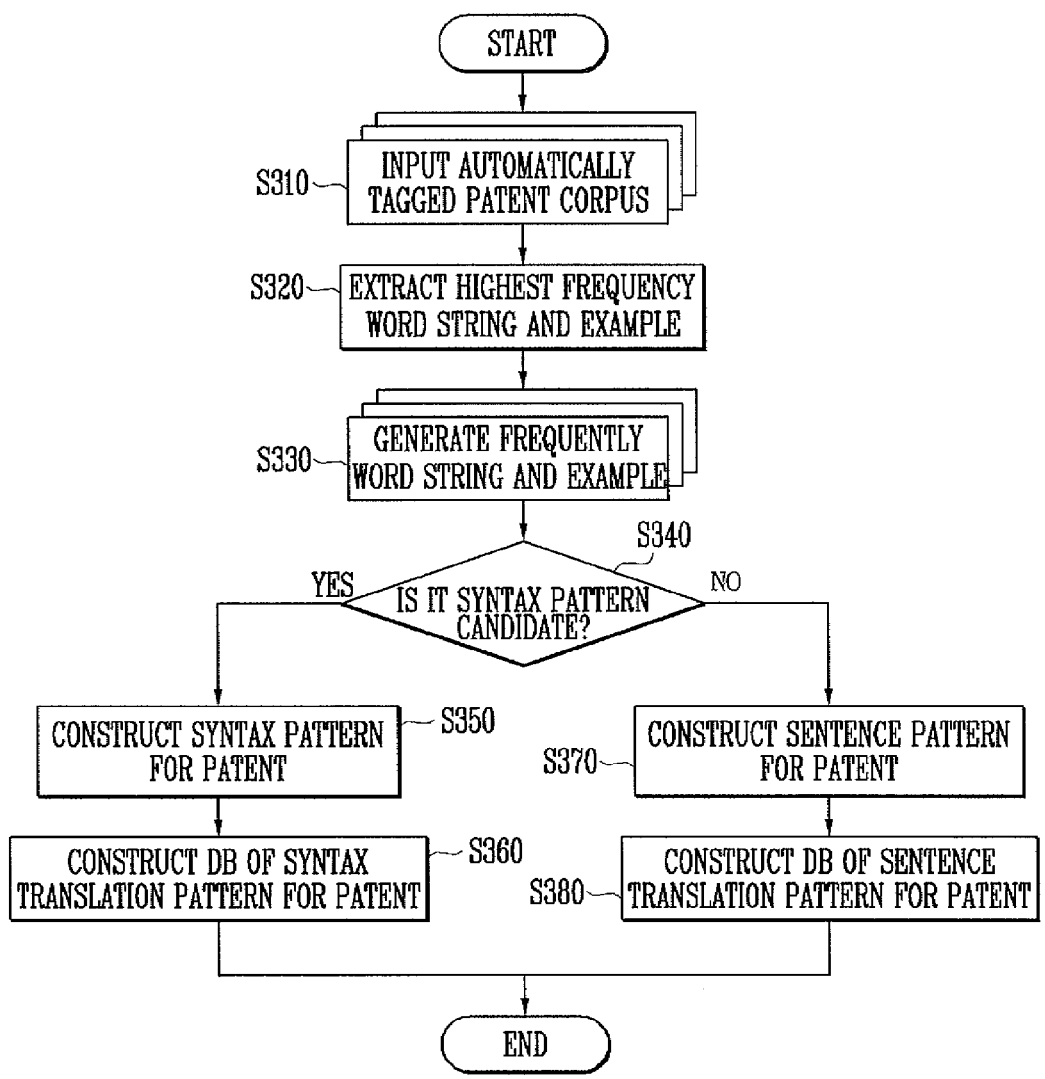
FIG. 5 is a flowchart illustrating a method of constructing a patent peculiar sentence or syntax pattern in an automatic translation method customized for patent documents according to the present invention.

FIG. 5 is a flowchart illustrating a method of constructing a patent peculiar sentence or syntax pattern in an automatic translation method customized for patent documents according to the present invention. The method illustrated in FIG. 5 will now be described in detail.

At first, a large automatically tagged patent corpus constructed in the first step is input (S310) and a boundary condition is checked so as to extract the highest frequency word string and example (S320), and thereby frequently repeated word strings and examples are generated (S330).

Then, it is determined that the generated frequently repeated word strings and examples are likely to be syntax pattern candidates or sentence pattern candidates (S340).

When determined to be the syntax pattern candidate (S340), it is checked whether the first and last words of the prescribed syntax pattern candidate correspond to a POS of a phrase's start/end node according to a structure analysis rule, or whether words on the side of the syntax pattern candidate correspond to a POS node between phrase nodes in the rule. Then, a syntax pattern for patents is constructed (S350), and such syntax patterns are accumulated to construct a syntax translation pattern DB for patents (S360).

Meanwhile, when determined to be the sentence pattern candidate (S340), a whole sentence is made into a sentence pattern for patents (S370), and such sentence patterns are accumulated to construct a sentence translation pattern DB for patents (S380).

An exemplary embodiment in which the syntax pattern for patents (S350) and sentence pattern for patents (S370) are constructed is as follows:

1) Example of Constructing Syntax Translation Pattern for Patents (S350)

Extracted frequently repeated word string and example:
in_accordance_with 20063 The present invention relates to a DC transformer/reactor in accordance with the introductory part of claim 1.

Constructed syntax translation pattern for patents: in accordance! with→에_따른!

2) Example of Constructing Sentence Translation Pattern for Patents (S370)

Extracted frequently repeated word string and example:
relates_to 20063 The present invention relates to a DC transformer/reactor in accordance with the introductory part of claim 1.

Constructed sentence translation pattern for patents: NP1 relate to NP2→NP1:[는]NP2:[에] 관한 것이!

As a fourth step, the morpheme-analyzed and tagged sentence is divided by the sentence pattern and the syntax pattern so as to parse each node of the sentence pattern and generate a final syntactic analysis result (S400).

Figure 6:
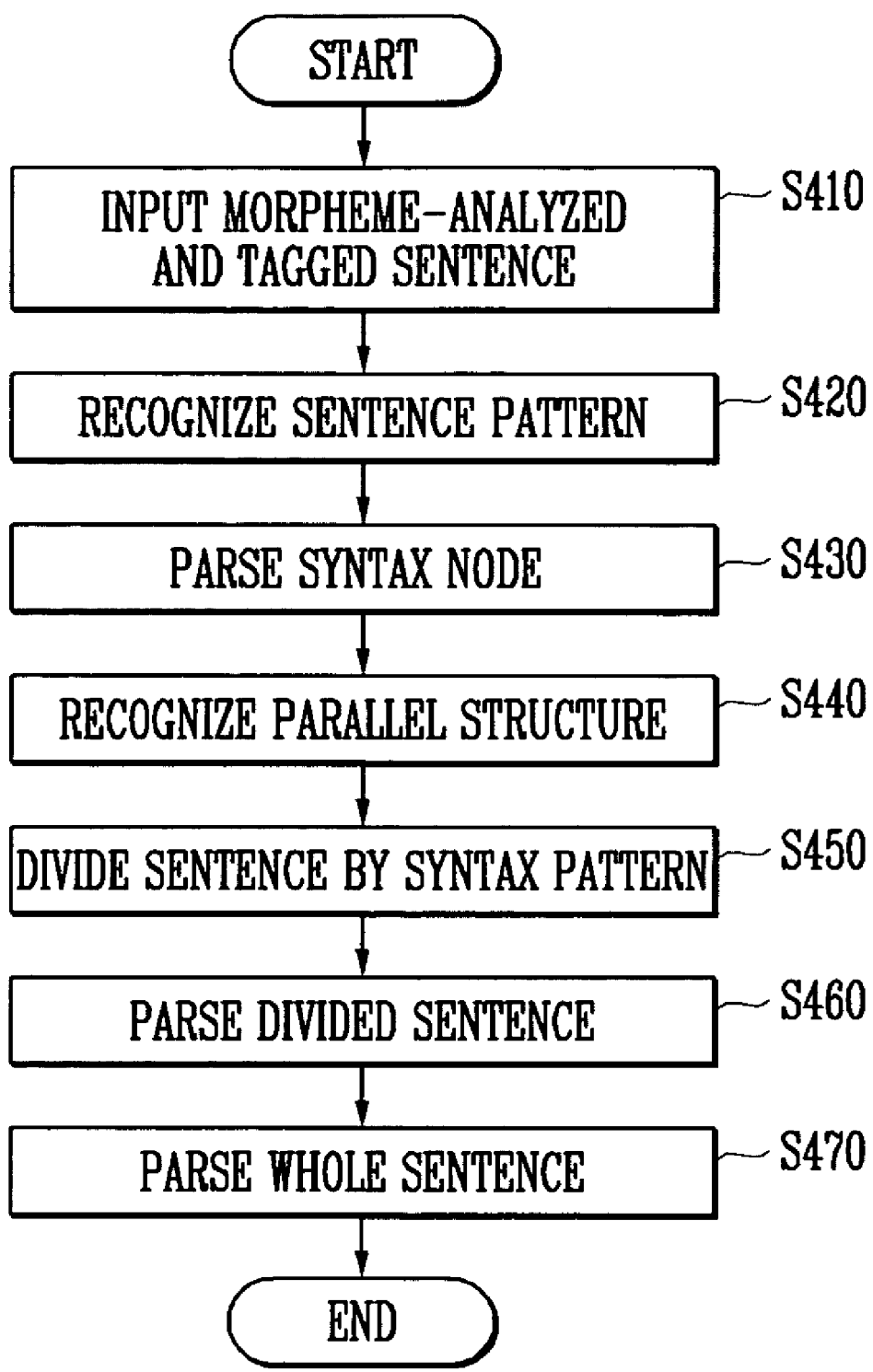
FIG. 6 is a flowchart illustrating a method of generating a final syntactic analysis result in an automatic translation method customized for patent documents according to the present invention.

FIG. 6 is a flowchart illustrating a method of generating a final syntactic analysis result in an automatic translation method customized for patent documents according to the present invention. Referring to FIG. 6, the method of generating the final syntactic analysis result will now be described in detail.

At first, the morpheme-analyzed and tagged sentence is input (S410), a sentence pattern of this sentence is recognized (S420), and syntax node parsing is performed on each node of the sentence pattern using the sentence pattern (S430).

Here, the sentence pattern has the scope of a whole sentence and comprises vocabulary and syntax nodes. The syntax nodes mainly correspond to a noun phrase NP, a verb phrase VP, a sentence S, etc., which are not arranged in sequence. Also, a recognition method of a sentence pattern includes: chart-parsing the node using the sentence pattern as a chart parser rule, retrieving a tagged result if syntax appears, and recognizing a scope from a word at a present position to a word next to a matching syntax node in the sentence pattern as the syntax node. Here, conditions for the recognized syntax are simply checked, and only if the conditions are satisfied, the syntax node is generated and added to an inactive chart.

Here, when the syntax node parsing is performed in units of a specific length or more, a parallel structure is recognized (S440), and the sentence is divided into parallel nodes according to the syntax pattern (S450).

These divided and recognized parallel nodes are set to be parsing units and then are parsed again (S460).

Here, possible scopes of parallel structures are recognized using the syntax data in advance. That is, in English the parallel syntax has a form of X→X, X, ..., and X, so all of the possible scopes are recognized as parallel structure candidates. In the recognized parallel structure, parallel nodes are recognized using the tagged result. The parallel nodes are broadly categorized as noun phrase NP, verb phrase VP, gerund VPG, sentence S, and independent participle construction SG. The categorization is performed by a heuristic search, not by parsing, as follows:

1) If there are one or more main verbs, and a noun/pronoun/numeral is preceded by the main verb, it is an S; if not, it is a VP.

2) If there is a participle form of a verb and a noun/pronoun/numeral is preceded by the participle form of the verb, it is an NP/SG; if not, it is a VPG.

3) Otherwise, it is an NP.

And, the following two restrictions on the syntax recognition result are checked:

1) Syntax nodes of all parallel nodes are equal.

2) When a verb or a preposition is preceded by a parallel structure, only an NP/VPG is possible.

The longest among the parallel structures satisfying the above conditions is selected.

When such parallel node parsing is attempted, if parsing units are a specific length or more, sentence division is performed by a determined syntax pattern and then the results are parsed. Here, the sentence division by the syntax pattern is unconditionally performed by a comma.

Finally, the results that have been partially parsed are treated as one chart and the whole sentence is parsed again, thereby generating a final structure analysis result (S470).

An exemplary embodiment of the method of generating the final syntax structure result, the fourth step (S400), will be described below with reference to the example of a patent document written in English.

EXEMPLARY EMBODIMENT

[input sentence]: "Construction of fixing a flexible sheet for use in an electronic device comprising a case being formed with a plurality of through holes, a chassis being accommodated in an interior of the case, a flexible sheet being disposed on a surface of the chassis and having a plurality of flexible switches arranged thereon, a circuit board being provided below the chassis and having a connector fixed thereon, and a plurality of manual buttons being provided above each flexible switch and being exposed from the through holes of the case to the outside of the case, the construction of fixing the flexible sheet wherein the flexible sheet comprises a flat plate portion being in close contact with the chassis and a flat cable portion which projects on an edge of the flat plate portion and with which a connecting terminal portion is provided on its end, the flat cable portion is folded back to the chassis to have the connecting terminal portion connected to the connector, and the chassis is provided with a lift-up prevention piece to prevent a part of the flat plate portion of the flexible sheet from being lifted up from a surface of the chassis."

[pattern application]: S→S:[vg], NP wherein S, S

[Pattern Recognition Result]:

(S:[vg] Construction of fixing a flexible sheet for use in an electronic device comprising a case being formed with a plurality of through holes, a chassis being accommodated in an interior of the case, a flexible sheet being disposed on a surface of the chassis and having a plurality of flexible switches arranged thereon, a circuit board being provided below the chassis and having a connector fixed thereon, and a plurality of manual buttons being provided above each flexible switch and being exposed from the through holes of the case to the outside of the case), (NP the construction of fixing the flexible sheet) wherein (S the flexible sheet comprises a flat plate portion being in close contact with the chassis and a flat cable portion which projects on an edge of the flat plate portion and with which a connecting terminal portion is provided on its end), (S the flat cable portion is folded back to the chassis to have the connecting terminal portion connected to the connector, and the chassis is provided with a lift-up prevention piece to prevent a part of the flat portion of the flexible sheet from being lifted up from a surface of the chassis.)

[Parsing Each Recognized Syntax Node]
syntax parsing S[vg], NP and S
[Parallel Structure Recognition]

(S[vg] construction of fixing a flexible sheet for use in an electronic device comprising (NP a case being formed with a plurality of through holes), (NP a chassis being accommodated in an interior of the case), (NP a flexible sheet being disposed on a surface of the chassis and having a plurality of flexible switches arranged thereon), (NP a circuit board being provided below the chassis and having a connector fixed thereon), and a plurality of manual buttons being provided above each flexible switch and being exposed from the through holes of the case to the outside of the case)

In the above example, the last node is not parenthesized into a syntax node, because the end scope of the last node is not known.

[Parsing Each Parallel Node]

After parsing each recognized NP, form tree of parallel structure.

In the above example, when there is no sentence pattern, first, a parallel structure is recognized and each syntax node is parsed. Then, the whole sentence is parsed again. Here, if the sentence is longer than a specific length, it is divided by one or more commas.

(Construction of fixing a flexible sheet for use in an electronic device comprising (NP a case being formed with a plurality of through holes), (NP chassis being accommodated in an interior of the case), (NP a flexible sheet being disposed on a surface of the chassis and having a plurality of flexible switches arranged thereon), (NP a circuit board being provided below the chassis and having a connector fixed thereon), and a plurality of manual buttons being provided above each flexible switch and being exposed from the through holes of the case to the outside of the case), (the construction of fixing the flexible sheet wherein the flexible sheet comprises a flat plate portion being in close contact with the chassis and a flat cable portion which projects on an edge of the flat plate portion and with which a connecting terminal portion is provided on its end), (the flat cable portion is folded back to the chassis to have the connecting terminal portion connected to the connector, and the chassis is provided with a lift-up prevention piece to prevent a part of the flat plate portion of the flexible sheet from being lifted up from a surface of the chassis.)

As a fifth step, the structure of the generated syntactic analysis result is transformed into a target language structure using a transformation pattern 605 according to the constructed sentence/phrase pattern, and then individual term transformation is performed using a simplex and compound noun dictionary (S600).

Figure 7:
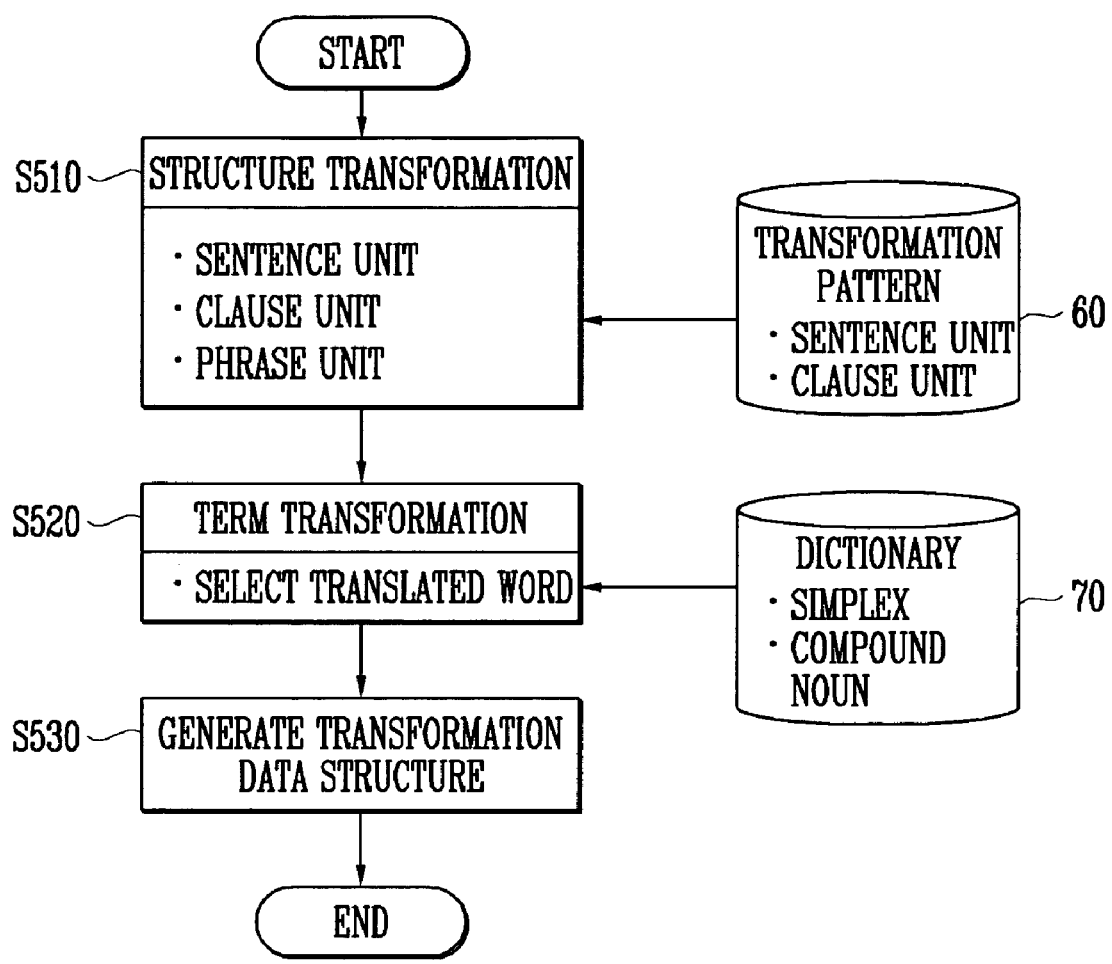
FIG. 7 is a flowchart illustrating a method of transforming an analysis result of a source language structure into a target language structure in an automatic translation method customized for patent documents according to the present invention.

FIG. 7 is a flowchart illustrating a method of transforming an analysis result of a source language structure into a target language structure in an automatic translation method customized for patent documents according to the present invention. Referring to FIG. 7, the transformation method will be described in detail.

First, the result of performing structure analysis on an input sentence in a source language is structurally transformed using a transformation pattern 60 constructed in the third step (S300) (S510). Here, the structural transformation is performed in sentences, clauses, and phrases, and the transformation pattern 60 chosen here is optimally matched to the structure analysis result in the fourth step (S400).

This completes the transformation into the target language sentence structure. Next, individual term transformation is performed using a simplex and compound noun dictionary 70 (S520). Here, in the step of term transformation, if there is a source term with multiple meanings, that is, if there is uncertainty in selecting a translated word, a function of selecting a translated word is performed to select an optimal translated word. In a patent document, which includes many technical terms, a translated word is generally selected according to frequency of use, which is less complicated than in a general domain.

When the structure and term transformation is complete, a transformation data structure for transferring corresponding results to a generating part is constructed (S530).

At last, as a sixth step, a final sentence in a target language is generated by the output, transformed structure and terms (S600).

As described above, the apparatus and method for automatic translation customized for documents in a restrictive domain according to the present invention have the following effects:

First, a patent domain is set as a narrower, particular translation domain, and therein customized translation knowledge is constructed. A patent document is automatically translated by using the customized translation knowledge and dividing long sentences. Thus, automatic translation quality can be improved enough to be of practical use in the patent field.

Second, since patent documents are increasingly shared around the world with the development of the wire/wireless communication technology, foreign patents can be more easily and economically referred to, thereby reducing patent infringement and drastically reducing a cost of retrieving/referring to foreign patents.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for automatic translation, comprising:
    a knowledge extracting part for extracting knowledge necessary for translating sentences constituting a document in a restrictive domain; and
    a translating part for generating an output for an input sentence based on a dictionary and a transformation pattern to which the extracted translation knowledge is applied, wherein the knowledge extracting part comprises:
    a technical term constructing part for extracting and constructing technical terms by constructing a corresponding corpus according to the document in the restrictive domain through morpheme-analyzing and tagging;
    a translated term constructing and filtering part for applying a weight and extracting a high-frequency expression by a longest-first method, filtering a sentence/phrase pattern, and constructing translated words for the constructed technical terms; and
    a sentence/phrase pattern constructing part for constructing a syntax translation pattern and a sentence translation pattern of a corresponding domain according to a frequently repeated word string and example based on the corresponding corpus.

2. The apparatus according to claim 1, wherein the weight is applied corresponding to word frequency and closeness with a co-occurring word according to the restrictive domain.

3. The apparatus according to claim 1, wherein the translating part comprises:
- a pre-processing part for dividing an input sentence, dividing terms appearing in the separated sentence into tokens, and classifying the tokens into symbols, formulae, and words;
- a morpheme-analyzing and tagging part for analyzing morphemes of the tokens, and tagging statistical parts of speech (POS) using a lexicalized HMM (Hidden Markov Model) produced with the assistance of the knowledge extracting part;
- a structure analyzing part for dividing the sentence which is morpheme-analyzed and tagged according to a sentence pattern and a syntax pattern, parsing each node of the pattern, and generating a final syntactic analysis result;
- a structure and term transforming part for transforming the structure of the syntactic analysis result using a transformation pattern according to the translation knowledge extracted from the knowledge extracting part so as to transform the result into a structure of a target language, and transforming each term using a dictionary; and
- a generating part for generating a final sentence in a target language with the transformed structure and terms output from the structure and term transforming part.

4. A method for automatic translation, comprising the steps of:
- (a) constructing a specific corpus according to a restrictive domain through morpheme-analysis and tagging and extracting technical terms from documents written in a source language;
- (b) applying a weight according to the restrictive domain and extracting a high-frequency expression by a longest-first method, filtering a sentence/phrase pattern, and constructing translated words for the constructed technical terms;
- (c) constructing a syntax translation pattern and a sentence translation pattern based on the specific corpus constructed in step (a);
- (d) dividing the morpheme-analyzed and tagged sentence according to a sentence pattern, parsing each node of the sentence pattern, and generating a syntactic analysis result;
- (e) performing transformation of a target language structure by transforming the structure of the syntactic analysis result using the syntax and sentence translation patterns constructed in step (c), and performing transformation of each term; and
- (f) generating a sentence in the target language by the transformed structure and terms.

5. The method according to claim 4, wherein step (a) comprises the steps of:
- (a1) inputting a large document corpus constructed from documents written in a source language, dividing the corpus into sentences, and classifying terms in the divided sentences into tokens;
- (a2) analyzing morphemes and tagging all parts of speech (POSs) that are allowable for each token;
- (a3) performing statistical POS tagging assigning a specific POS to each word using predetermined word/POS/context probability data and word probability data, and constructing a specific corpus to which the specific POS is assigned; and
- (a4) extracting a technical term from the specific corpus.

6. The method according to claim 5, wherein step (a1) comprises a step of dividing a long sentence according to a long sentence division rule when an input document has a long sentence.

7. The method according to claim 5, wherein each token in step (a1) is defined as one of a symbol, a formula, and a word.

8. The method according to claim 5, wherein step (a4) is performed by satisfying at least one of the following conditions:
- Condition 1) unknown word: word which is not be found in a general domain dictionary; or
- Condition 2) $w_i$, word satisfying <Formula 1>:

$$\sum_{j=1}^{k} \text{abs}\left(\frac{f(w_i, t_{ij})}{f(w_i)} - \frac{f'(w_i, t_{ij})}{f'(w_i)}\right) \geq \alpha \quad \text{<Formula 1>}$$

or $$\max_{j=1}^{k} \text{abs}\left(\frac{f(w_i, t_{ij})}{f(w_i)} - \frac{f'(w_i, t_{ij})}{f'(w_i)}\right) \geq \beta$$

wherein, $f(w_i)$ denotes total frequency of word $w_i$ in a general domain, $f(w_i, t_{ij})$ denotes frequency with which word $w_i$ is represented as POS $t_{ij}$ in a general domain, $f'(w_i)$ denotes total frequency of word $w_i$ in a corresponding domain, $f'(w_i, t_{ij})$ denotes frequency with which word $w_i$ is represented as POS $t_{ij}$ in a corresponding domain, $\alpha$ denotes total sum of threshold values, and $\beta$ denotes maximum threshold value.

9. The method according to claim 4, wherein step (b) comprises the steps of:
- (b1) calculating occurrence frequency of each translated word in each dictionary entry from the specific corpus;
- (b2) extracting terms co-occurring with the each translated word and calculating mutual information between the terms;
- (b3) calculating a use weight of each translated word using values obtained from the word frequency and co-occurring words;
- (b4) applying the use weight of the translated word and filtering a translated word of each dictionary entry according to importance of use in a specific domain; and
- (b5) constructing translated words for the technical terms based on the filtered sentence/phrase pattern and defined weight.

10. The method according to claim 4, wherein the weight of step (b) corresponds to word frequency and closeness with co-occurring terms according to the restrictive domain.

11. The method according to claim 4, wherein step (c) comprises the steps of:
- (c1) extracting the highest frequency string of the specific corpus constructed in step (a), and generating a frequently repeated word string and example from the extracted string;
- (c2) determining possibility of being a syntax or sentence pattern candidate;
- (c3) checking whether the frequently repeated word string and example are a start/end node of a phrase or a POS node and constructing a specific syntax translation pattern, when the frequently repeated word string and example are determined to be the syntax pattern candidate; and
- (c4) constructing a specific sentence translation pattern for a whole sentence, when the frequently repeated word string and example are determined to be the sentence pattern candidate.

12. The method according to claim 4, wherein step (d) comprises the steps of:

(d1) determining a pattern of the morpheme-analyzed and tagged sentence;

(d2) recognizing a parallel structure, dividing the sentence by parallel node parsing, and performing syntax node parsing, when determined to be the syntax pattern;

(d3) performing syntax node parsing for each node of the sentence pattern, when determined to be the sentence pattern; and (d4) treating the syntax node parsed result as one chart, parsing the whole sentence again, and generating a final structure analysis result.

13. The method according to claim 12, wherein the parallel structure recognition comprises the steps of:

generating a parallel structure candidate by the syntax pattern, when a partial sentence to be syntax node parsed is longer than a specific length; and selecting a parallel structure by a parallel node recognition means and a syntax node limitation with respect to each candidate of the parallel structure.

14. The method according to claim 4, wherein step (e) comprises the steps of:

(e1) transforming a structure of an input document in the source language into a sentence structure of the target language using the syntax and sentence translation pattern constructed in step (c);

(e2) selecting an optimal translated word for each source word according to the source language document using a simplex and compound noun dictionary, and performing term-by-term transformation; and (e3) producing a transformation data structure based on the structure and term transformation results.

15. The method according to claim 14, wherein the structural transformation in step (e1) is performed in sentences, clauses and phrases.

* * * * *